(12) United States Patent
Campbell et al.

(10) Patent No.: US 11,279,603 B2
(45) Date of Patent: Mar. 22, 2022

(54) SYSTEMS AND METHODS FOR MOBILE DIMENSIONING AND WEIGHING

(71) Applicant: Illinois Tool Works Inc., Glenview, IL (US)

(72) Inventors: Stewart Campbell, Gloucester (GB); Paul Steven Hines, Birmingham (GB)

(73) Assignee: Illinois Tool Works Inc., Glenview, IL (US)

( * ) Notice: Subject to any disclaimer, the term of this patent is extended or adjusted under 35 U.S.C. 154(b) by 966 days.

(21) Appl. No.: 15/885,184

(22) Filed: Jan. 31, 2018

(65) Prior Publication Data

US 2019/0233268 A1  Aug. 1, 2019

(51) Int. Cl.
*B66F 9/075* (2006.01)
*G01G 23/37* (2006.01)
(Continued)

(52) U.S. Cl.
CPC ........ *B66F 9/07504* (2013.01); *G01B 3/1061* (2013.01); *G01B 5/02* (2013.01);
(Continued)

(58) Field of Classification Search
CPC ..... B66F 9/07504; G01B 3/1061; G01B 5/02; G01B 21/04; G01B 19/083; G01G 23/3735; G01G 19/083; G06Q 10/08345
See application file for complete search history.

(56) References Cited

U.S. PATENT DOCUMENTS 6,115,114 A  *  9/2000  Berg ..................... G01B 11/00
                                                      177/25.15
7,992,317 B1     8/2011  Cannata
(Continued)

FOREIGN PATENT DOCUMENTS

CN          102282447          12/2011
CN          104346716          2/2015
(Continued)

OTHER PUBLICATIONS

Int'l Search Report and Written Opinion Appln. No. PCT/US2019/013580 dated May 23, 2019.
(Continued)

*Primary Examiner* — Bryan Bui
(74) *Attorney, Agent, or Firm* — McAndrews, Held & Malloy, Ltd.

(57) ABSTRACT

Systems and methods for mobile dimensioning and weighing are disclosed. An example mobile weighting and dimensioning system includes a truck scale system and a tape measure. The truck scale system includes: a fork scale to weigh a parcel that is held by forks; and a weight indicator to receive an indication of the weight of the parcel from the fork scale. The tape measure includes: a tape cartridge to spool and unspool a tape having electronically readable indicia; a measurement circuit to determine linear dimensions of the parcel by reading the electronically readable indicia in response to trigger events; and a communications circuit to transmit the first linear dimension of the parcel to the weight indicator. The weight indicator associates the weight and the first linear dimension with an identifier of the parcel, and transmits the weight, the first linear dimension, and the identifier to a computing system.

17 Claims, 7 Drawing Sheets

(51) Int. Cl.
   *G06Q 10/08* (2012.01)
   *G01B 21/04* (2006.01)
   *G01B 5/02* (2006.01)
   *G01G 19/08* (2006.01)
   *G01B 3/1061* (2020.01)

(52) U.S. Cl.
   CPC ........... *G01B 21/04* (2013.01); *G01G 19/083* (2013.01); *G01G 23/3735* (2013.01); *G06Q 10/08345* (2013.01)

(56) References Cited

U.S. PATENT DOCUMENTS

| | | | |
|---|---|---|---|
| 8,134,717 | B2 | 3/2012 | Pangrazio |
| 8,228,510 | B2 | 7/2012 | Pangrazio |
| 9,600,797 | B2 | 3/2017 | Moir |
| 9,774,986 | B2 | 9/2017 | Hoge |
| 10,535,040 | B2* | 1/2020 | Rizkallah ........... G06Q 30/0635 |
| 2006/0106742 | A1 | 5/2006 | Bochicchio |
| 2006/0112023 | A1 | 5/2006 | Horhann |
| 2007/0283590 | A1 | 12/2007 | White |
| 2010/0057593 | A1* | 3/2010 | Moir .................... G01G 19/415 705/29 |
| 2011/0290567 | A1 | 12/2011 | Waggoner |
| 2014/0250708 | A1 | 9/2014 | Bauer |
| 2016/0146660 | A1 | 5/2016 | Larsen |
| 2017/0082413 | A1 | 3/2017 | Park |

FOREIGN PATENT DOCUMENTS

| | | |
|---|---|---|
| CN | 205373645 | 7/2016 |
| CN | 107067197 | 8/2017 |
| EP | 2722656 | 4/2014 |
| EP | 3203180 | 8/2017 |

OTHER PUBLICATIONS

Triner Scale, iForks Wireless Forklift Scale System, www.trinerscale.com, Triner Scale and Mfg. Co., Inc., 2 Pages.
https://www.ravas.com/en-GB/products/cubetape-mobile-dimensioning-and-data-capture. Embedded Video on page 'RAVAS iForks and Cubetape @ DB Schenker* (also available at https://vimeo.com/86690321) (Vimeo dates video "4 years ago") No date.
OIML R 35-1 Edition 2007(E) Int'l Recommendation Including Amendment 2014, Material measures of length for general use Part 1: Metrological and technical requirements.
C190POS Scanner-Dimensioner, Cubetape Improve Productivity In Your Freight Operations With The Industry's Most Advanced And Rugged Bluetooth Scanner Dimensioner, www.cubetape.com, Dec. 2017.
C190PRO Cubetape Product Guide W+I Revenue Protection Revenue Protection in Terminals and Freight Depots, Aww.cubetape.com, Dec. 2017.
Casestudy, DB Schenker Logistics Netherlands, Weighing, identifying and dimensioning of palletized shipments in a safe, fast and automated way No date.

* cited by examiner

SYSTEMS AND METHODS FOR MOBILE DIMENSIONING AND WEIGHING

BACKGROUND

This disclosure relates generally to material handling, and more particularly, to systems and methods for mobile dimensioning and weighing.

Currently, freight operators rely heavily on the weight and size of a parcel as declared by the shipper of the parcel. However, the declared data is often inaccurate. For instance, shippers may not have the correct equipment to accurately weigh and size large items. To ensure that the freight operator is appropriately compensated for handling the parcel (e.g., revenue protection), the freight operator must check the shipper declared data.

SUMMARY

Systems and methods for mobile dimensioning and weighing are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

The freight operator may perform revenue protection checks of parcel weight and/or parcel dimensions based on desired criteria, or may perform revenue protection checks on all parcels that are handled. Conventional revenue protection checks may include using static floor scales and/or static bench-type scales to verify weight. Conventional revenue protection techniques also involve transporting the parcel to a designated area for weighing and/or dimensioning, which reduces throughput due to the extra time required to transport the parcel to and from the static revenue protection equipment. Dimensions may be manually captured and manually entered into a billing system, and/or automatically captured using a visual dimensioning device.

During busy periods, conventional revenue protection techniques may become a bottleneck to the parcel handling process, which can create delay, require additional resources to be deployed to perform revenue protection checks, and/or cause the freight operator to reduce the number of revenue protection checks being performed. Thus, conventional revenue protection systems reduce revenue and/or increase costs to the freight handler.

Some conventional systems provide weight and/or dimensioning data to a personal digital assistant (PDA) or similar handheld computing device. In such conventional systems, the PDA receives the weight from a scale, receives the dimension information from an operator or tape measure, and associates the data with a parcel identifier. The PDA may interface with a back-office system to provide the parcel identifier, weight, and dimensions for processing.

Disclosed systems and methods provide a legal-for-trade mobile volumetric weighing solution that operates within freight operators' natural process flows. Disclosed examples use existing freight operators' handing equipment, such as forklift trucks, powered pallet trucks, and/or manual pallet trucks. For example, disclosed systems and methods may be installed into new handling equipment, and/or be retrofitted to make existing handling equipment legal-for-trade. In contrast with conventional systems, disclosed systems do not require a separate PDA or similar device to collect and transmit the weight and/or dimension data. Relative to conventional solutions, the disclosed systems are more easily integrated into existing systems to provide weight and/or dimension data, improve operator efficiency by enabling mobile weighing and dimensioning, reduce the number of devices used to measure and provide the weight and/or dimension data, and enable measurements that are legal for trade.

As used herein, the term "dimensioning" refers to determining the physical dimensions of an object. An example of dimensioning involves measuring the height, width, and length of an object. However, other physical dimensions may be used (e.g., circumference).

Disclosed example mobile weighting and dimensioning systems include a truck scale system and a tape measure. The truck scale system includes a fork scale configured to weigh a parcel that is held by forks, and a weight indicator configured to receive an indication of the weight of the parcel from the fork scale. The tape measure includes a tape cartridge configured to spool and unspool a tape having electronically readable indicia. The tape measure also includes a measurement circuit to determine a first linear dimension of the parcel by reading one of the electronically readable indicia in response to a first trigger event. The tape measure also includes a communications circuit to transmit the first linear dimension of the parcel to the weight indicator, where the weight indicator associates the weight and the first linear dimension with an identifier of the parcel, and transmits the weight, the first linear dimension, and the identifier to a computing system.

In some examples, the fork truck scale comprises at least one of a pallet truck scale or a forklift truck scale. In some examples, the tape has a maximum measurement length of less than 3 meters, and the measurement circuit at least is accurate to within 0.1 millimeters. In some examples, the communications circuit includes a wireless communications circuit. In some such examples, the wireless communications circuit communicates via at least one of Bluetooth, Zigbee, Wi-Fi, near field communications, radio frequency identification, Z-wave, or cellular communications.

In some example systems, the computing system includes an enterprise resource planning system. In some examples, the measurement circuit of the tape measure determines a second linear dimension of the parcel by reading one of the electronically readable indicia in response to a second trigger event, and determines a third linear dimension of the parcel by reading one of the electronically readable indicia in response to a third trigger event. In such examples, the communications circuit transmits the second linear dimension and the third linear dimension to the weight indicator. In some such examples, the first linear dimension, the second linear dimension, and the third linear dimension comprising a height of the parcel, a width of the parcel, and a length of the parcel. In some examples, the weight indicator associates the second linear dimension and the third linear dimension with the identifier of the parcel, and transmits the second linear dimension and the third linear dimension to the computing system.

In some examples, the weight indicator further includes a display device, in which the weight indicator calculates a volume of the parcel based on the first linear dimension, the second linear dimension, and the third linear dimension, and the display device displays the volume. In some such examples, the weight indicator calculates a volumetric weight of the parcel and to display the weight of the parcel with a visual indication based on the comparison. In some examples, the weight indicator calculates a volumetric weight of the parcel and to transmit the volumetric weight to the computing system.

In some example systems, the weight indicator includes a display device to display the weight, the first dimension, and the identifier. In some examples, the tape measure further includes a scanning device to read a barcode associated with the parcel in response to a second trigger event, determine the identifier of the parcel based on the barcode, and transmit the identifier to the weight indicator. In some examples, the tape measure includes a scanning device to read a barcode associated with the parcel in response to a second trigger event, and transmit information represented by the barcode to the weight indicator, in which the weight indicator determines the identifier of the parcel based on the information represented by the barcode.

In some example systems, the weight indicator comprises a machine readable storage device configured to store the weight and the first dimension in association with the identifier, the weight indicator configured to transmit data associated with a plurality of parcels to the computing system as a batch transfer. In some examples, the tape and the fork scale have accuracies that meet requirements for Class II devices under the International Organization of Legal Metrology (OIML) standard R35.

Figure 1:
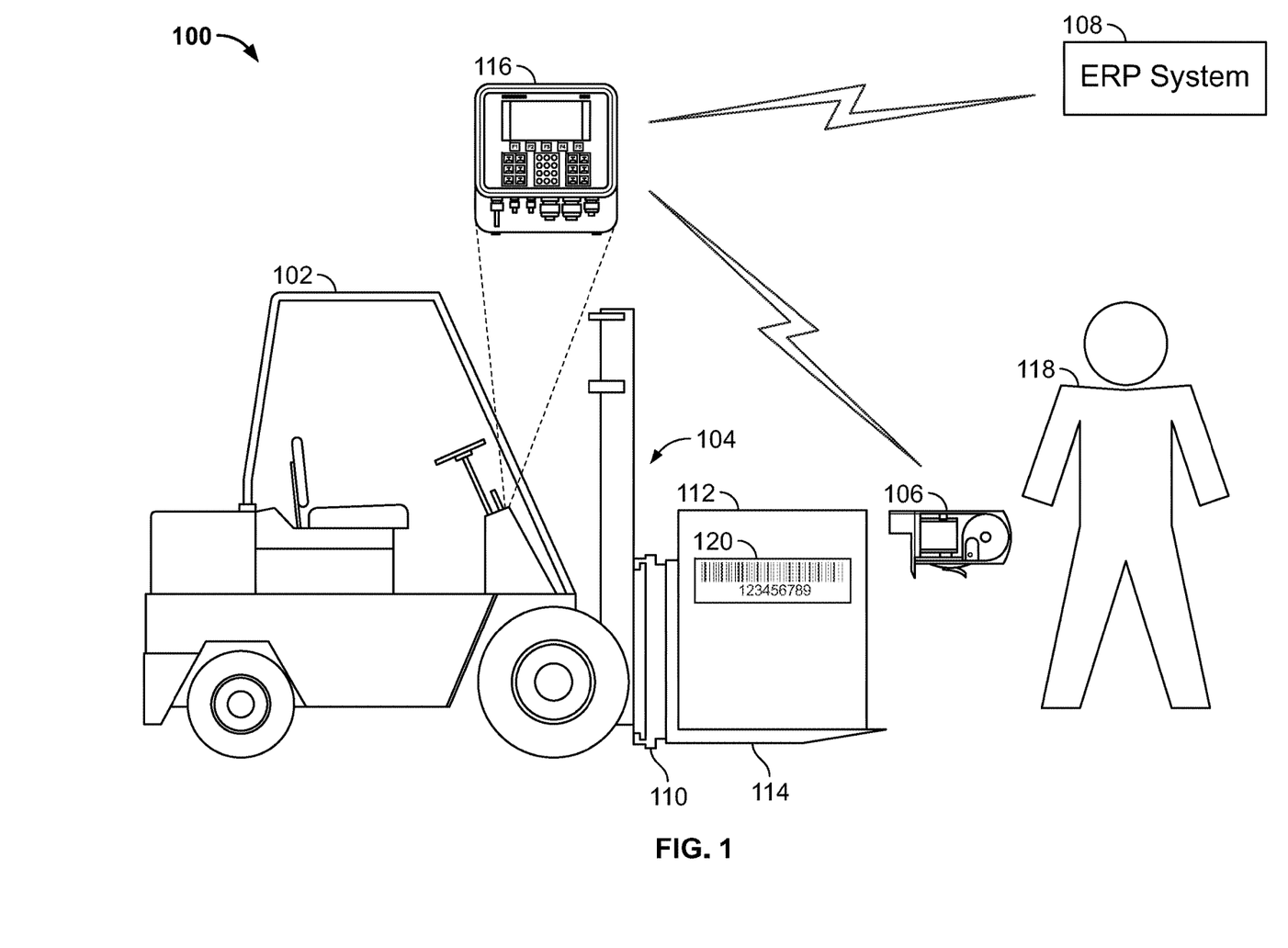
FIG. 1 is an example system to perform mobile weighing and dimensioning of parcels, in accordance with aspects of this disclosure.

FIG. 1 is an example system 100 to perform mobile weighing and dimensioning of parcels. The example system 100 may be used to implement a revenue protection system of a freight operator. The system 100 includes a truck 102 including a truck scale system 104, a tape measure 106, and an enterprise resource planning (ERP) system 108.

The truck scale system 104 includes a fork scale 110 configured to weigh a parcel 112 that is held by forks 114 of the truck 102. The truck scale system 104 also includes a weight indicator 116 configured to receive an indication of the weight of the parcel from the fork scale 110. The example weight indicator 116 is mounted or otherwise attached to the truck 102. For example, the weight indicator 116 may be mounted to hang from a roll cage or mounted to a dashboard of a forklift truck, or mounted on a handle of a pallet truck. The example fork scale 110 is a legal-for-trade scale, with an accuracy of +/−200 grams for hand pallet trucks (e.g., capable of measuring a load up to 1000 kg), an accuracy of +/−500 grams for powered pallet trucks (e.g., capable of measuring a load between 1001 kg and 2500 kg), or an accuracy of +/−2000 grams for forklift trucks (e.g., capable of measuring a load between 2501 kg and 5000 kg).

The tape measure 106 may be used by an operator 118 to scan a tag 120 (e.g., a one-dimensional barcode, a two-dimensional barcode (e.g., a QR code), an RFID tag, an NFC tag, and/or any other electronically readable indicia associated with the parcel 112) and/or to measure the dimensions of the parcel 112. The example tape measure 106 is communicatively coupled to the weight indicator 116, and provides the data from the barcode 120 and/or the measured dimensions to the weight indicator 116. In response to receiving the barcode data and/or the measured dimensions, the weight indicator 116 displays the measured weight from the fork scale 110, the dimensions, and/or an identifier of the parcel 112 on a display.

The weight indicator 116 transmits the measured weight and the measured dimensions in association with the parcel identifier (or barcode data) to a remote computing system such as the ERP system 108. In some examples, the weight indicator 116 may store measured weight and measured dimension information for multiple parcels, and transmit the information to the ERP system 108 at a later time (e.g., at the conclusion of a time period, when the weight indicator 116 is within wireless communication range of an access point connected to the ERP system 108, etc.).

The example system 100 of FIG. 1 is a legal-for-trade system, such that the measured weight and/or dimension data may be used for billing and invoicing. To this end, both the fork scale 110 and the tape measure 106 meet the accuracy, precision, and/or repeatability standards required for trade approval by the applicable regulatory body.

Figure 2:
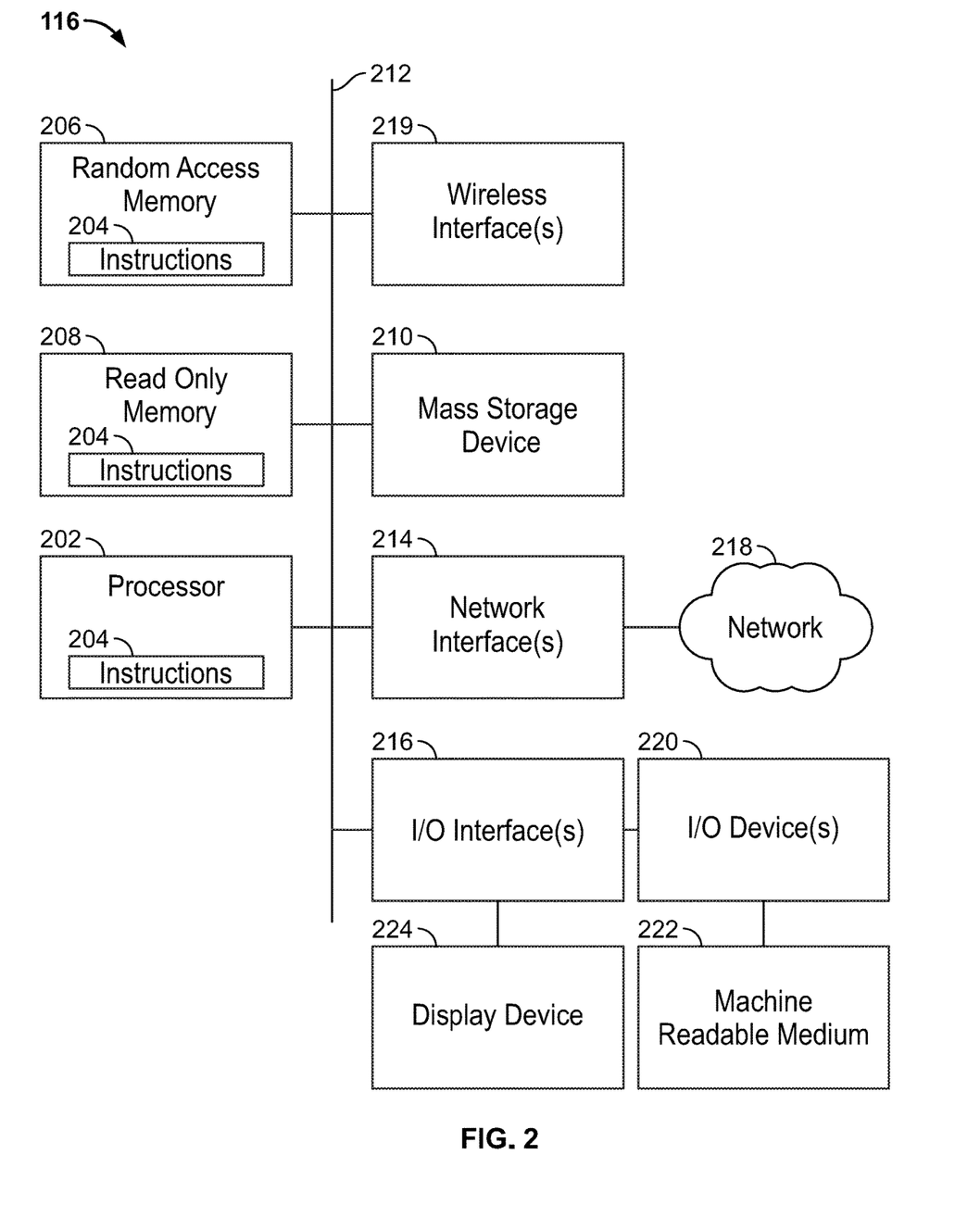
FIG. 2 is a block diagram of an example implementation of the weight indicator of FIG. 1.

FIG. 2 is a block diagram of an example computing system 200 that may be used to implement the weight indicator 116 of FIG. 1. The example weight indicator 116 may be affixed to a truck, such as a forklift truck or a pallet truck.

The example weight indicator 116 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the weight indicator 116 to a communications network 218 such as the Internet. For example, the network interface 214 may include IEEE 202.X-compliant wireless and/or wired communications hardware for transmitting and/or receiving communications. The weight indicator 116 also includes wireless interface(s) 219 to connect the weight indicator 116 to one or more local devices (e.g., peer-to-peer wireless connection(s)). For example, the wireless interface(s) 219 may include hardware, firmware, and/or software to wirelessly connect the weight indicator 116 to the fork scale 110 and/or to the tape measure 106 (e.g., via Bluetooth, Zigbee, Wi-Fi, near field communications (NFC), radio frequency identification (RFID), Z-wave, and/or cellular communications).

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example weight indicator 116 includes a display device 224 (e.g., an LCD screen) coupled to the I/O interface 216. Other example I/O device(s) 220 may include a keyboard, a keypad, a mouse, a trackball, a pointing device, a microphone, an audio speaker, an optical media drive, a multi-touch touch screen, a gesture recognition interface, a magnetic media drive, and/or any other type of input and/or output device.

The example weight indicator 116 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

In operation, the weight indicator 116 receives (e.g., via the wireless interface(s) 219) an indication of the weight of the parcel 112 from the fork scale 110, and one or more dimensions of the parcel 112 and/or an identifier of the parcel 112 from the tape measure 106. The weight indicator 116 may display the weight, the dimensions, and/or the identifier on the display device 224 to, for example, enable the operator to verify that the data is to be associated with the parcel. In some examples, the weight indicator 116 may enable the operator to verify, cancel, and/or modify the data via one or more of the I/O devices 220.

The weight indicator 116 may store weights, dimensions, and/or parcel identifiers for multiple parcels in RAM 206, in the mass storage device 210, and/or on the machine readable medium 222. The weight indicator 116 may transmit the weights, dimensions, and/or identifiers to a remote computer system (e.g., the ERP system 108 of FIG. 1) via the network interface(s) 214 and/or the wireless interface(s) 219. For example, the network interface(s) 214 and/or the wireless interface(s) 219 may detect when the weight indicator 116 is in communication with a remote computing system (e.g., the ERP system 108) and/or in communication with the network 218. For example, the network interface(s) 214 and/or the wireless interface(s) 219 may identify when the weight indicator 116 is within communication range of a wireless access point to which the weight indicator 116 may transmit the weights, dimensions, and/or parcel identifiers to the ERP system 108.

In some examples, in addition to transmitting the data to the ERP system 108, the weight indicator 116 stores the data to a local storage device (e.g., the mass storage device 210, the machine readable medium 222 such as a removable USB storage device, etc.) to provide data resiliency. If a time limit is reached without a confirmation of successful transfer received at the weight indicator 116, the weight indicator 116 displays a message or otherwise provides an alert to manually initiate a data transfer from the weight indicator 116 to the ERP system 108.

Figure 3:
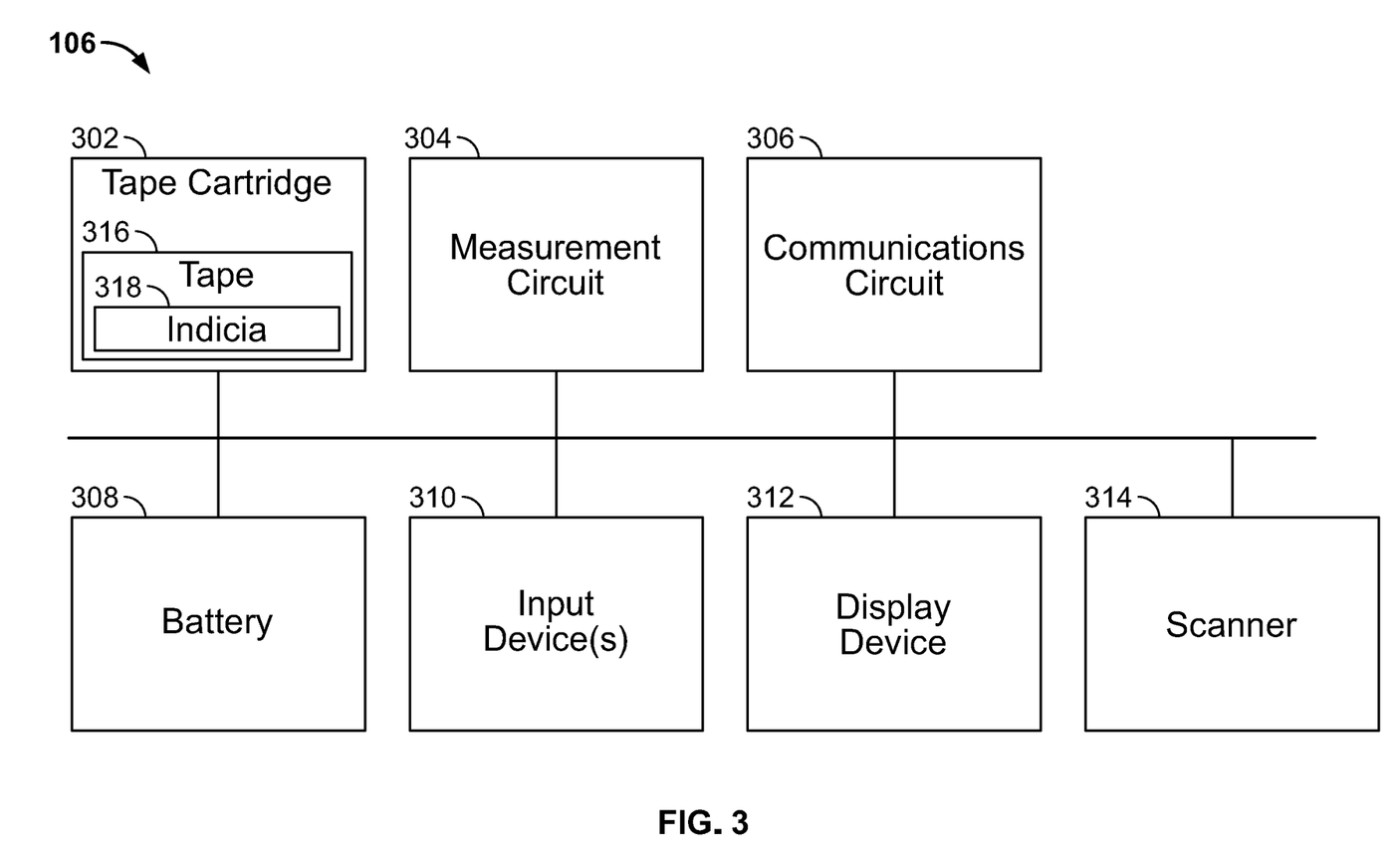
FIG. 3 is a block diagram of an example implementation of the tape measure of FIG. 1.

FIG. 3 is a block diagram of an example implementation of the tape measure 106 of FIG. 1. The example tape measure 106 of FIG. 3 includes a tape cartridge 302, a measurement circuit 304, a communications circuit 306, a battery 308, one or more input device(s) 310, a display device 312, and a scanner 314.

The tape cartridge 302 spools and unspools a tape 316 that has electronically readable indicia 318 printed or otherwise fixed onto the tape 316. In the example of FIG. 3, the electronically readable indicia 318 are printed such that the tape measure 106 is sufficiently accurate so as to be legal-for-trade (e.g., class II trade approved), as defined by the OIML or similar applicable organization. For example, the electronically readable indicia 318 are printed or otherwise affixed to the tape 316 with an accuracy in accordance with the requirements for Class II under the OIML standard (e.g., within 0.1 millimeters if the tape 316 has a maximum measurement length of 3 meters or less under the OIML standard (2007 addition, including amendment 2014)). For example, the distance between an edge of one indicium and the same edge of the adjacent indicium is 0.9 mm or less, with each indicium identifying the measurement length at the midpoint of the indicium along the length of the tape 316.

The measurement circuit 304 determines linear dimensions (e.g., of the parcel 112 of FIG. 1) by reading one or more of the electronically readable indicia 318 in response to a trigger event. The electronically readable indicia 318 may be different for each separate segment of the tape 316. For example, if each section of the tape 316 includes a barcode representing a different value, the measurement circuit 304 may include a barcode reader. The barcode reader reads the barcode that is printed on a section of the tape 316 and indicates a length of the tape 316 that is unspooled from the tape cartridge 302. The measurement circuit 304 is arranged to read the indicia 318 on the tape 316 such when an object is measured with the tape measure 106, the measurement circuit 304 reads the correct indicia 318 that correspond to the measured length.

The example scanner 314 reads a tag associated with the parcel 112 (e.g., the tag 120 of FIG. 1) in response to a trigger event. The tag may be a one-dimensional barcode, a two-dimensional barcode (e.g., a QR code), an RFID tag, an NFC tag, and/or any other electronically readable indicia associated with the parcel 112. The scanner 314 may determine the identifier of the parcel 112 based on the data contained in the tag and transmit the identifier to the weight indicator 116 (e.g., via the communications circuit 306). In some other examples, the scanner 314 transmits raw data from the tag to the weight indicator 116, which may parse the data and extract the identifier of the parcel 112.

While example data that may be included on the tag includes a unique identifier of the parcel 112, other data may be included in the tag and/or associated with the tag via a lookup table. For example, the tag may include the weight and/or dimensions declared by the shipper, the identity of the shipper, the origin of the parcel 112, the destination of the parcel 112, special instructions to the operator regarding the parcel 112, and/or any other information.

The communications circuit 306 transmits the measured linear dimension(s) of the parcel 112 and/or the identifier of the parcel 112 to the weight indicator 116. For example, the communications circuit 306 may include hardware, firmware, and/or software to wirelessly transmit data to the weight indicator 116 (e.g., via Bluetooth, Zigbee, Wi-Fi, near field communications (NFC), radio frequency identification (RFID), Z-wave, and/or cellular communications).

The input device(s) 310 may include a trigger or other button or switch that causes the measurement circuit 304 to determine a length of the tape 316 that is unspooled (e.g., by reading one of the electronically readable indicia 318). The input device(s) 310 may also include a trigger, button, or other switch to cause the scanner 314 to attempt to read a tag from the parcel 112. Additionally or alternatively, the example input device(s) 310 may include buttons or other input hardware that enables an operator to manipulate captured data, such as commanding the tape measure 106 to transmit captured measurements, identifiers, and/or other data to the weight indicator 116, and/or canceling captured measurements (e.g., erroneously captured measurements). The example display device 312 displays information for the operator, such as data obtained from the tag, measurements captured by the measurement circuit 304, confirmation of successful transmission of data to the weight indicator 116, error notifications, and/or other status information about the tape measure 106.

The example battery 308 provides power for the components in the tape measure 106. The example tape measure 106 may have a battery that provides for tool-free removal, and/or stores sufficient power to maintain tape measure configuration for up to an upper time limit while the battery 308 is being changed.

Figure 4:
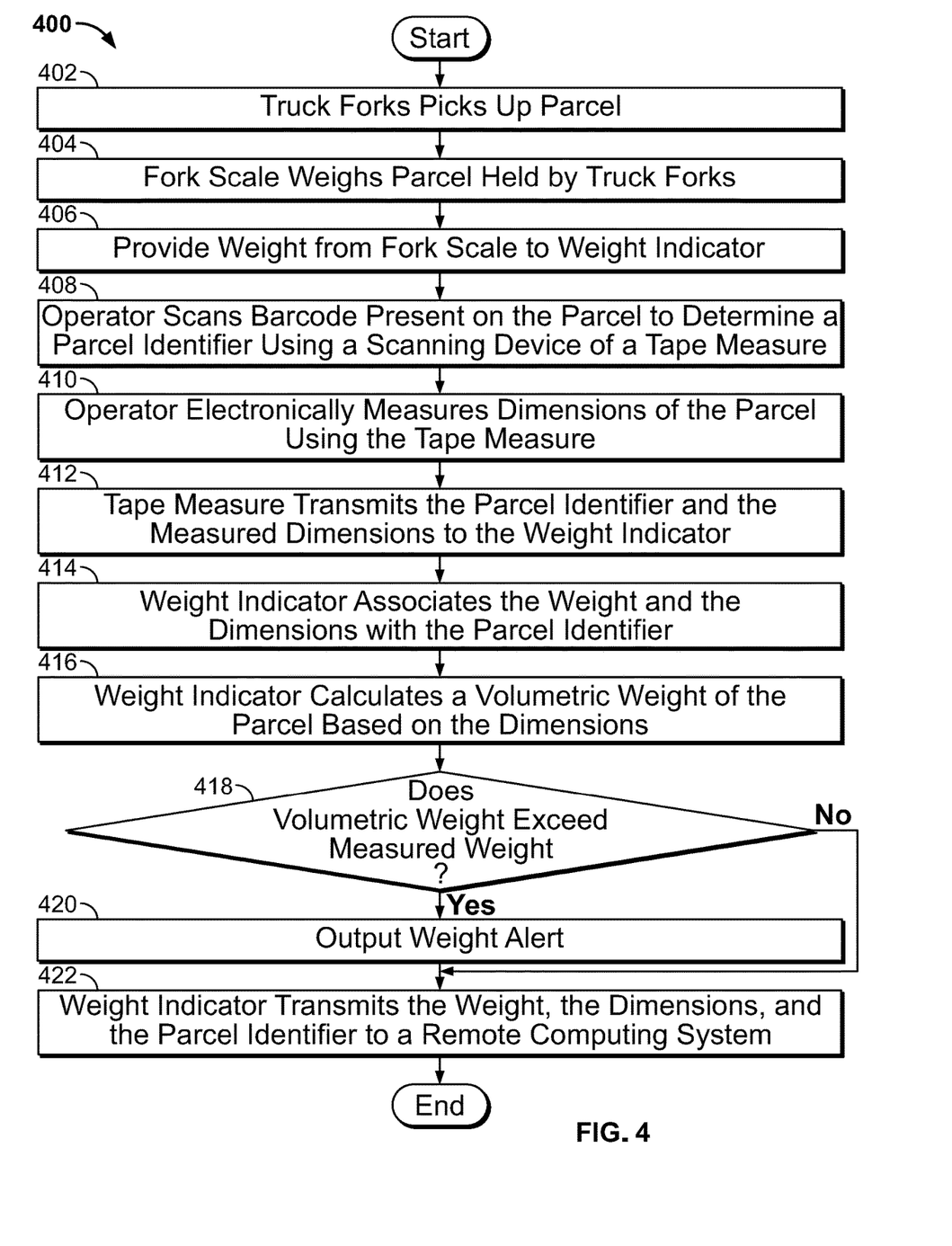
FIG. 4 is a flowchart representative of example method that may be performed by the example weight indicator of FIGS. 1 and/or 3 to capture volumetric and weight information about a parcel.

FIG. 4 is a flowchart representative of example method 400 that may be performed by the system 100 of FIG. 1 to capture dimension and weight information about a parcel (e.g., the parcel 112). The example method 400 is described below with reference to the weight indicator 116, the tape measure 106 and, more generally, the system 100 of FIGS. 1-3.

At block 402, the truck forks 114 are used to pick up the parcel 112. At block 404, the fork scale 110 weighs the parcel 112 held by the truck forks 114. At block 406, the fork scale 110 provides (e.g., transmits) the measured weight of the parcel 112 to the weight indicator 116.

At block 408, the operator 118 scans a tag (e.g., the tag 120) present on the parcel 112 using the scanner 314 of the tape measure 106. By scanning the tag, the tape measure 106 may determine a parcel identifier, declared weight and/or dimensions, and/or other information associated with the parcel 112.

At block 410, the operator 118 electronically measures the dimensions (e.g., width, length, height) of the parcel 112 using the tape measure 106. For example, the operator 118 may place the tape measure 106 in a measurement position for each measured dimension and trigger the measurement circuit 304 using the input device(s) 310 to measure the indicia 318 printed on the tape 316, to thereby electronically determine and store each measurement.

At block 412, the tape measure 106 transmits (e.g., via the communication circuit 306) the parcel identifier (and/or any other data from the tag 120) and the measured dimensions to the weight indicator 116. At block 414, the weight indicator 116 associates the weight and the dimensions with the parcel identifier.

At block 416, the example weight indicator 116 calculates a volumetric weight of the parcel 112 based on the dimensions. For example, the weight indicator 116 may determine a volume of the parcel 112 based on the dimensions, and divide the volume by a factor determined by the shipper (e.g., predetermined and configured into the weight indicator 116) to determine a volumetric weight.

At block 418, the weight indicator 116 determines whether the volumetric weight exceeds a measured weight. If the volumetric weight exceeds a measured weight (block 418), at block 420 the weight indicator 116 outputs a weight alert (e.g., via the display device 224). In some examples, the weight indicator 116 may attach a flag or other data element to the weight and/or dimension information for the parcel 112 for transfer to the ERP system 108.

If the volumetric weight does not exceed a measured weight (block 418), or after outputting the weight alert (block 420), at block 422 the weight indicator 116 transmits the weight, the dimensions, and the parcel identifier to a remote computing system (e.g., the ERP system 108). In some examples, block 422 is performed at a later time when the remote computing system is not immediately available to receive the transmission from the weight indicator 116. In some examples, block 422 occurs in response to an operator input via an input device, such as a confirmation by the operator that the weight and/or dimensions are confirmed.

After transmitting the weight, the dimensions, and the parcel identifier, the example method 400 may end. In some examples, the method 400 is iterated for additional parcels in a manner that improves parcel handling and revenue protection efficiency by the operator 118 compared to conventional parcel handling and revenue protection techniques.

Figure 5:
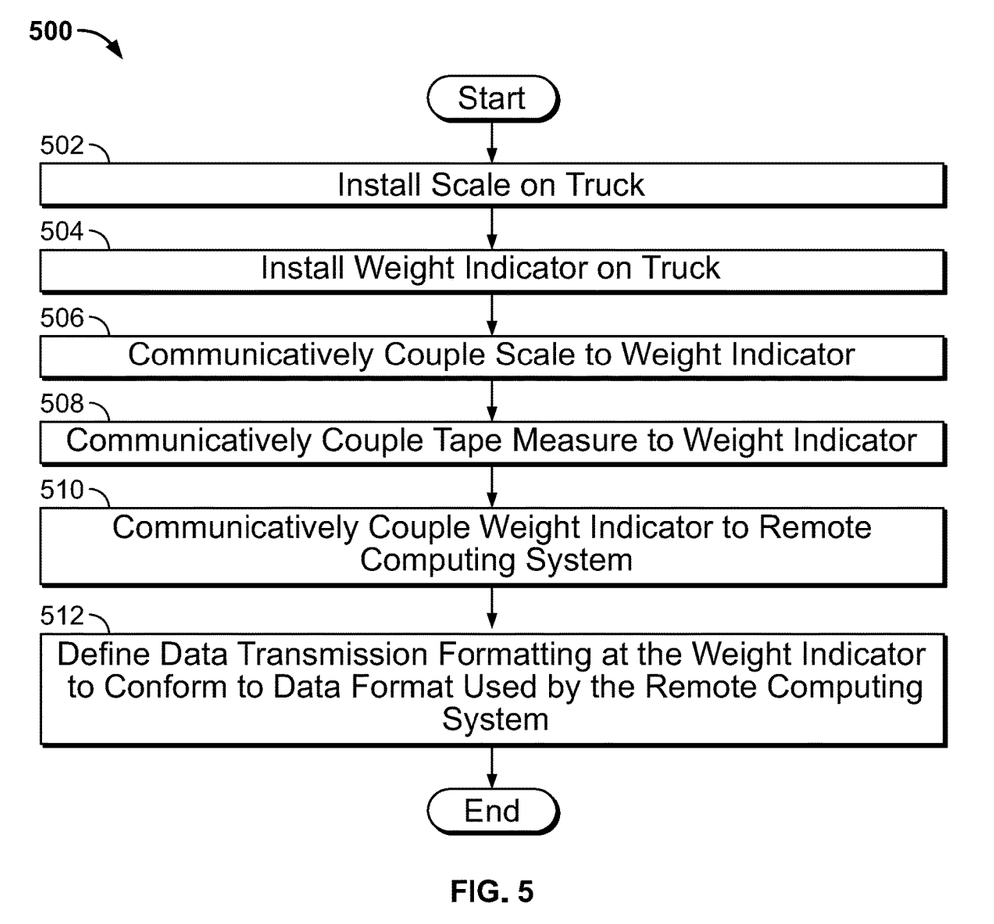
FIG. 5 is a flowchart representative of example method that may be performed by the example weight indicator of FIGS. 1 and/or 3 to capture volumetric and weight information about a parcel.

FIG. 5 is a flowchart representative of example method 500 that may be performed to install the system 100 in a parcel handling facility having existing equipment such as forklift trucks.

At block 502, the fork scale 110 is installed on a truck (e.g., the forklift truck 102 of FIG. 1). Installation of the fork scale 110 may involve removal of existing forks and/or addition of the forks 114 attached to the fork scale 110. At block 504, the weight indicator 116 is installed on the truck 102. For example, the weight indicator 116 may be attached onto the truck 102 in a location visible to the operator of the truck 102.

At block 506, the fork scale 110 is communicatively coupled to the weight indicator 116. For example, the fork scale 110 may be coupled via a wired connection (e.g., USB) and/or via a wireless connection to the weight indicator 116 (e.g., Wi-Fi, Bluetooth, Zigbee, Z-wave, etc.). At block 508, the tape measure 106 is coupled to the weight indicator 116. The example tape measure 106 is wirelessly coupled to the weight indicator 116 via any appropriate wireless communication technique.

At block 510, the weight indicator 116 is communicatively coupled a remote computing system, such as the ERP system 108 of FIG. 1. For example, the weight indicator 116 may be provided with authentication information for accessing a wireless access point coupled to the ERP system 108. Additionally or alternatively, the weight indicator 116 may be paired with a device configured to forward data transmitted from the weight indicator 116 to the ERP system 108.

At block 512, an operator, technician, administrator, or other personnel associated with the weight indicator 116 and/or the ERP system 108 defines a data transmission format to be used by the weight indicator 116 to conform to the data format used at the ERP system 108 (or other remote computing system). For example, the weight indicator 116 may be configured (e.g., using the I/O devices 220, by importing a configuration file, and/or any other technique) to output the dimension data, the weight data, the parcel identifier, and/or any other information, in a format for which the ERP system 108 is already configured to process data. By defining the data format at the weight indicator 116, the ERP system 108 does not need to be configured to receive the data from the weight indicator 116 in the particular format used by the weight indicator 116. In some examples, the data transmission format is defined prior to installation of the weight indicator 116.

Figure 6:
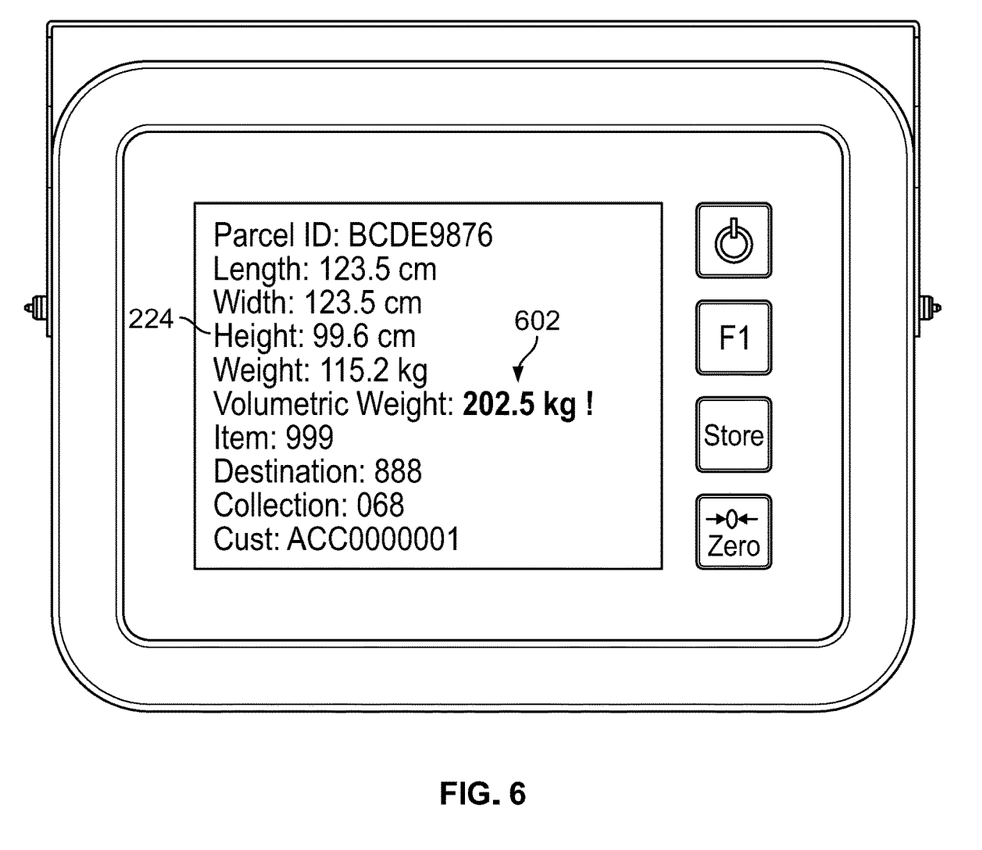
FIG. 6 illustrates an example weight indicator during operation, in accordance with aspects of this disclosure.

FIG. 6 illustrates an example weight indicator 116 during operation. As illustrated in FIG. 6, the weight indicator 116 includes the I/O device(s) 220 and the display device 224. In the illustrated example, the display device 224 displays the parcel identifier received from the tape measure 106, the dimensions of the parcel received from the tape measure 106, the weight received from the fork scale 110, and a calculated volumetric weight. Because the volumetric weight of the illustrated example is greater than the measured weight, the display device 224 displays the volumetric weight with an alert graphic 602.

Figure 7:
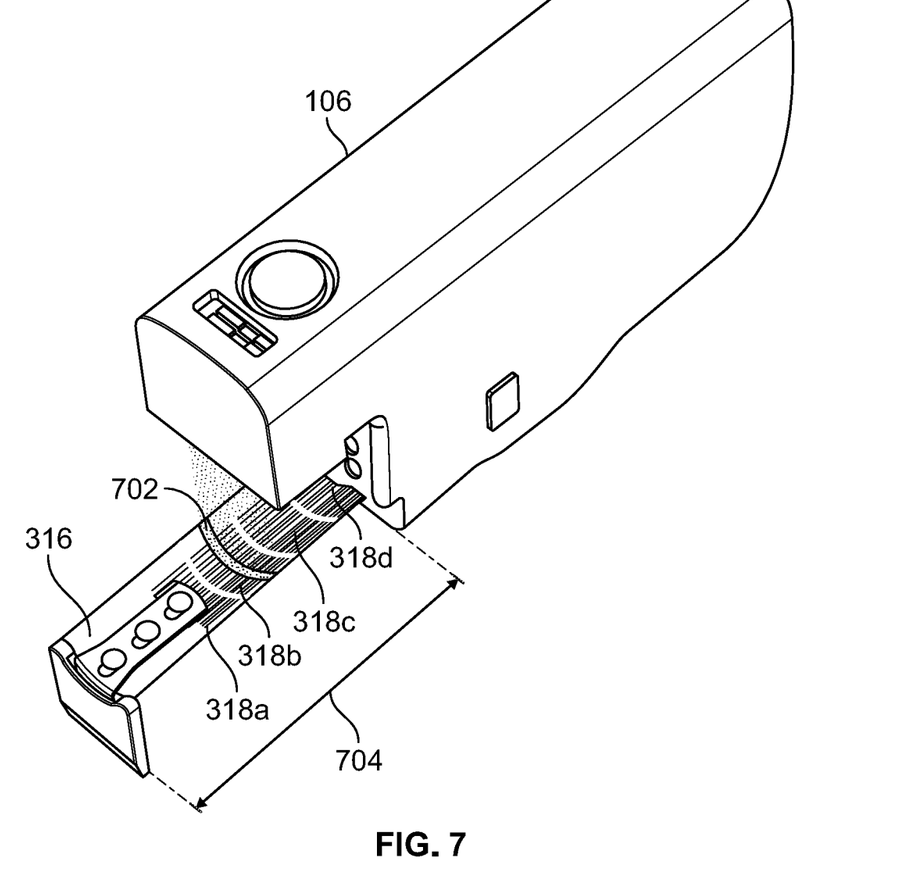
FIG. 7 illustrates an example tape measure during operation, in accordance with aspects of this disclosure.

FIG. 7 illustrates an example tape measure 106 during operation. As illustrated in FIG. 7, the tape 316 is unspooled from the tape measure 106 to reveal multiple electronically readable indicia 318a-318d. As mentioned above, each of the indicia 318a-318d (e.g., a barcode extending a specific length of the tape 316 corresponds to a respective length the tape 316. The example measurement circuit 304 may output a laser 702 to read one of the indicia (e.g., the indicium 318b) that corresponds to the measured length 704. The height of each of the indicia 318a-318d (e.g., in the direction 706 of the length of the tape 316) is limited to less than a legal-for-trade maximum error value for the length of the tape 316.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A mobile weighting and dimensioning system, comprising:
   a truck scale system, comprising:
      a fork scale configured to weigh a parcel that is held by forks; and
      a weight indicator configured to receive an indication of the weight of the parcel from the fork scale; and
   a tape measure, comprising:
      a tape cartridge configured to spool and unspool a tape having electronically readable indicia;
      a measurement circuit configured to determine a first linear dimension of the parcel by reading one of the electronically readable indicia in response to a first trigger event; and
      a communications circuit configured to transmit the first linear dimension of the parcel to the weight indicator, the weight indicator further configured to:
         associate the weight and the first linear dimension with an identifier of the parcel; and
         transmit the weight, the first linear dimension, and the identifier to a computing system for storage, processing, or display.

2. The system as defined in claim 1, wherein the fork truck scale comprises at least one of a pallet truck scale or a forklift truck scale.

3. The system as defined in claim 1, wherein the tape has a maximum measurement length of less than 3 meters, and the measurement circuit at least is accurate to within 0.1 millimeters.

4. The system as defined in claim 1, wherein the communications circuit comprises a wireless communications circuit.

5. The system as defined in claim 4, wherein the wireless communications circuit is configured to communicate via at least one of Bluetooth, Zigbee, Wi-Fi, near field communications, radio frequency identification, Z-wave, or cellular communications.

6. The system as defined in claim 1, wherein the computing system comprises an enterprise resource planning system.

7. The system as defined in claim 1, wherein the measurement circuit is further configured to:
   determine a second linear dimension of the parcel by reading one of the electronically readable indicia in response to a second trigger event; and
   determine a third linear dimension of the parcel by reading one of the electronically readable indicia in response to a third trigger event, the communications circuit configured to transmit the second linear dimension and the third linear dimension to the weight indicator.

8. The system as defined in claim 7, wherein the first linear dimension, the second linear dimension, and the third linear dimension comprising a height of the parcel, a width of the parcel, and a length of the parcel.

9. The system as defined in claim 7, wherein the weight indicator is configured to:
   associate the second linear dimension and the third linear dimension with the identifier of the parcel; and
   transmit the second linear dimension and the third linear dimension to the computing system.

10. The system as defined in claim 7, wherein the weight indicator further comprises a display device, wherein the weight indicator is configured to calculate a volume of the parcel based on the first linear dimension, the second linear dimension, and the third linear dimension, and the display device is configured to display the volume.

11. The system as defined in claim 10, wherein the weight indicator is configured to calculate a volumetric weight of the parcel and to display the weight of the parcel with a visual indication based on the comparison.

12. The system as defined in claim 10, wherein the weight indicator is configured to calculate a volumetric weight of the parcel and to transmit the volumetric weight to the computing system.

13. The system as defined in claim 1, wherein the weight indicator comprises a display device configured to display the weight, the first dimension, and the identifier.

14. The system as defined in claim 1, wherein the tape measure further comprises a scanning device configured to:
   read a tag associated with the parcel in response to a second trigger event;
   determine the identifier of the parcel based on the tag; and
   transmit the identifier to the weight indicator.

15. The system as defined in claim 1, wherein the tape measure further comprises a scanning device configured to:
   read a barcode associated with the parcel in response to a second trigger event; and
   transmit information represented by the barcode to the weight indicator, the weight indicator configured to determine the identifier of the parcel based on the information represented by the barcode.

16. The system as defined in claim 1, wherein the weight indicator comprises a machine readable storage device configured to store the weight and the first dimension in association with the identifier, the weight indicator configured to transmit data associated with a plurality of parcels to the computing system as a batch transfer.

17. The system as defined in claim 1, wherein the tape and the fork scale have accuracies that meet requirements for Class II devices under the International Organization of Legal Metrology (OIML) standard R35.

* * * * *